(12) United States Patent
Gaertner

(10) Patent No.: US 11,458,423 B2
(45) Date of Patent: Oct. 4, 2022

(54) FLUID FILTER WITH A FILTER CONNECTING PIECE HAVING AN OUTER SECTION, A MIDDLE SECTION AND AN INNER SECTION

(71) Applicant: Robert Bosch GmbH, Stuttgart (DE)

(72) Inventor: Oliver Gaertner, Abstatt (DE)

(73) Assignee: Robert Bosch GmbH, Stuttgart (DE)

( * ) Notice: Subject to any disclaimer, the term of this patent is extended or adjusted under 35 U.S.C. 154(b) by 824 days.

(21) Appl. No.: 16/338,644

(22) PCT Filed: Sep. 20, 2017

(86) PCT No.: PCT/EP2017/073700
§ 371 (c)(1),
(2) Date: Apr. 1, 2019

(87) PCT Pub. No.: WO2018/065211
PCT Pub. Date: Apr. 12, 2018

(65) Prior Publication Data
US 2019/0217225 A1 Jul. 18, 2019

(30) Foreign Application Priority Data
Oct. 7, 2016 (DE) ...................... 10 2016 219 526.3

(51) Int. Cl.
*B01D 29/33* (2006.01)
*B60T 8/36* (2006.01)
(Continued)

(52) U.S. Cl.
CPC ............ *B01D 29/33* (2013.01); *B60T 8/3615* (2013.01); *B60T 8/4031* (2013.01); *F04B 53/20* (2013.01)

(58) Field of Classification Search
CPC ..... B01D 29/33; B60T 8/3615; B60T 8/4031; F04B 53/02
See application file for complete search history.

(56) References Cited

U.S. PATENT DOCUMENTS

| 6,171,083 B1 | 1/2001 | Schuller |
| 6,267,569 B1 | 7/2001 | Alaze |
| 6,412,645 B1 | 7/2002 | DuHack |

FOREIGN PATENT DOCUMENTS

| CA | 1033309 A | 6/1978 |
| DE | 594 899 C | 3/1934 |

(Continued)

OTHER PUBLICATIONS

International Search Report corresponding to PCT Application No. PCT/EP2017/073700, dated Jan. 3, 2018 (German and English language document) (5 pages).

*Primary Examiner* — Waqaas Ali
(74) *Attorney, Agent, or Firm* — Maginot, Moore & Beck LLP

(57) ABSTRACT

A fluid filter for a fluid device with one or more of a pump element and a solenoid valve in a motor vehicle, in particular for an ESP system. The fluid filter is formed by direct injection molding and has at least one filter connecting piece. The filter connecting piece has an outer section, a middle section, and an inner section. The outer section is in the form of a projection that is directed outwards with respect to the fluid filter. The inner section is in the form of a projection that is directed inwards with respect to the fluid filter.

10 Claims, 7 Drawing Sheets

(51) Int. Cl.
*B60T 8/40* (2006.01)
*F04B 53/20* (2006.01)

(56) References Cited

FOREIGN PATENT DOCUMENTS

| DE | 10 2004 020 548 A1 | 11/2005 | | |
|---|---|---|---|---|
| DE | 10 2005 005 677 A1 | 8/2006 | | |
| DE | 10 2010 031 328 A1 | 1/2012 | | |
| DE | 102011083657 A1 * | 3/2013 | ......... | B01D 46/0015 |
| GB | 579 562 A | 8/1946 | | |
| JP | S38-009189 B | 6/1963 | | |
| JP | S51-069267 A | 6/1976 | | |
| JP | H11-257245 A | 9/1999 | | |
| JP | 2002-518636 A | 6/2002 | | |
| JP | 2002-525243 A | 8/2002 | | |
| JP | 2013-113443 A | 6/2013 | | |

\* cited by examiner

FLUID FILTER WITH A FILTER CONNECTING PIECE HAVING AN OUTER SECTION, A MIDDLE SECTION AND AN INNER SECTION

This application is a 35 U.S.C. § 371 National Stage Application of PCT/EP2017/073700, filed on Sep. 20, 2017, which claims the benefit of priority to Serial No. DE 10 2016 219 526.3, filed on Oct. 7, 2016 in Germany, the disclosures of which are incorporated herein by reference in their entirety.

BACKGROUND

The present disclosure relates to a fluid filter for a fluid apparatus having a pump element and/or a solenoid valve in a motor vehicle, in particular for an ESP system, the fluid filter being produced by direct injection molding, the fluid filter having at least one filter interconnecting piece. According to the disclosure, the fluid filter is distinguished by the fact that the filter interconnecting piece comprises an outer section, a middle section and an inner section, the outer section being configured as a projection which is directed outward with regard to the fluid filter, and the inner section being configured as a projection which is directed inward with regard to the fluid filter.

Piston pumps and solenoid valves are known from the prior art in different embodiments.

Radial piston pumps can be used as piston pumps for vehicle brake systems, in the case of which radial piston pumps at least one piston can be moved to and fro by means of an eccentric. It is known here to fasten a separate component made from plastic to the piston, on which separate component an inlet valve seat is configured. Here, the piston element which is formed in this way can be guided in a liner, a plurality of guide rings and sealing rings being provided. In order to protect the piston pump against contaminants in the fluid which is to be conveyed, a filter is provided, furthermore, in the region of the inlet into the piston pump. Here, the filter can be arranged in a feed line or in a region of the fluid path upstream of the piston, in order to filter contaminants out of the fluid. Patent application DE 10 2004 020 548 A1, for example, is known from the prior art.

Furthermore, patent application DE 10 2005 005 677 A1 is known from the prior art. Said document relates to a valve which can be actuated electromagnetically, in particular for brake systems in motor vehicles, which valve is arranged in a valve block which has an inflow bore and an outflow bore for pressure medium. An outflow gap is configured between a cutout and the valve housing, which outflow gap is covered by a sleeve-shaped filter element which makes the throughflow of pressure medium possible.

Furthermore, FIGS. 1a, 1b, 2a and 2b show and describe detailed illustrations in respect of fluid filters from the prior art. On account of high flow velocities, turbulent flows can occur at the interconnecting pieces on account of the current woven fabric geometry. Possible reverse overflowing of the filter woven fabrics with high volumetric flows additionally worsens this state. Said turbulent flows lead to vibrations which can trigger a fatigue fracture of the woven fabric. This is also observed, for example, in continuous operations.

SUMMARY

In contrast, the filter according to the disclosure advantageously makes it possible to optimize the flow guidance at this location. This is made possible by way of the features of the disclosure. Developments of the disclosure are specified in the dependent patent claims.

The disclosure relates to a fluid filter for a fluid apparatus having a pump element and/or a solenoid valve in a motor vehicle, in particular for an ESP system, the fluid filter being produced by direct injection molding, the fluid filter having at least one filter interconnecting piece. According to the disclosure, the fluid filter is distinguished by the fact that the filter interconnecting piece comprises an outer section, a middle section and an inner section, the outer section being configured as a projection which is directed outward with regard to the fluid filter, and the inner section being configured as a projection which is directed inward with regard to the fluid filter.

This is understood to mean that the fluid filter has a filter interconnecting piece or a multiplicity of filter interconnecting pieces. The filter interconnecting pieces are elements which are connected to one another. The connections provide passages, however, with the result that a filter network is produced which can be flowed through by a fluid. The filter interconnecting pieces are flowed around here by the fluid during the throughflow through the filter network. The filter interconnecting pieces therefore extend along and/or parallel to the fluid flowing direction. According to the disclosure, a filter interconnecting piece consists of at least three sections: an outwardly directed outer section, an inwardly directed inner section and a middle section which is situated in between. The filter interconnecting piece might therefore be understood to be constructed from three bodies, the three bodies being connected directly to one another. In relation to material and manufacturing, the filter interconnecting piece, just like the entire filter, is formed from a material in a manufacturing process.

Here, the middle section can configure the connection of the filter interconnecting piece to the rest of the filter. In one specific embodiment, the middle sections of the filter interconnecting pieces correspond to a circular wall which defines the filter. That is to say, the filter interconnecting pieces are integrated by means of their middle sections into the filter. The outer section and the inner section are configured, for example, in the form of a freestanding element. They therefore represent a projection (or an elevation or a bulge). Here, for example, the interconnecting piece itself can be configured so as to run around over the entire circumference. In this form, the filter interconnecting piece corresponds to a circumferential disk. Of course the interconnecting piece can also be interrupted over the circumference of the fluid filter, or a plurality of filter interconnecting pieces can be configured over the circumference. In this form, the filter interconnecting piece corresponds to a plurality of circumferential segments. In one alternative embodiment, however, the filter interconnecting piece can also be of rod-shaped configuration at points. That is to say, a multiplicity of interconnecting pieces are configured and arranged next to one another over the circumference of the filter.

As a result, a reduction or prevention of turbulent flows can advantageously be achieved. This leads to a reduction of vibrations. The risk of a fracture formation and fatigue failures and/or fatigue fractures is decreased and reduced as a result. The core concept of the disclosure is therefore an optimization of the interconnecting piece geometry of the filter which is produced by direct injection molding. The flow-optimized geometry prevents or reduces turbulent flows to a considerable extent. Vibrations and therefore a subsequent fatigue failure of the filter interconnecting pieces are thus prevented. The precise geometry of the flow-optimized interconnecting pieces can be determined by CFD (computational fluid dynamics) simulation. This advantageously results in a reduction of the turbulent flows and therefore a reduction of the risk of fracture. Furthermore, the optimized interconnecting piece geometry can advantageously be implemented in the injection molding die in a cost-neutral manner.

In one advantageous embodiment, the fluid filter is distinguished by the fact that the outer section and the inner section of the filter interconnecting piece are configured in such a way that their geometries can be described in each case by means of a differentiable function.

This is to be understood to mean that the geometric course of the outer section and inner section is constant in a mathematically functional description. The gradient change is also likewise constant. That is to say, there are no edges and/or no kink in the contour of the outer section and inner section. Here, the contours of the bodies, that is to say the outer section and the inner section, are configured for being flowed around by a fluid at a high flowing velocity. A middle piece is configured between the front piece and the end piece of the filter interconnecting piece. Said middle section is also designed for a fluid at a high flowing velocity. In particular, the middle section of the filter interconnecting piece has a constant geometry. Here, the middle section is substantially parallel to the flow direction of the fluid.

A flow breakaway can advantageously be reduced or avoided by way of the described design of the contour of the bodies. As a result, furthermore, reverse overflowing of the filter interconnecting piece is achieved, which is favorable in flow terms, if the filter is operated bidirectionally.

In one possible refinement, the fluid filter is distinguished by the fact that the outer section and/or the inner section of the filter interconnecting piece have/has a flow-optimized shape.

This is understood to mean that the outer section and/or the inner section are/is configured in a way which is suitable for designing the flow guidance in accordance with the respective requirements. For this purpose, the shape and geometry of the bodies, the contour of the bodies, the surface condition or the like can be of corresponding design. In addition to the flow resistance reduction, for example, the (fatigue) strength of the components and the noise and vibration behavior (NVH) can also apply as requirements. In one alternative refinement, not only the individual regions of the outer section and the inner section, but rather the entire filter interconnecting piece, that is to say the outer section and the middle section and the inner section, is designed in such a way that there is a flow-optimized overall shape.

As a result, an increased reduction up to the prevention of turbulent flows can advantageously be achieved. A pronounced reduction of vibrations can also be achieved. Furthermore, this makes reverse overflowing which is favorable in flow terms possible.

In one preferred embodiment, the fluid filter is distinguished by the fact that the outer section and/or the inner section have/has a flattening geometry.

This is to be understood to mean that the geometric shape of the outer contour has a vertex for the outer section in the case of a longitudinal section through the filter interconnecting piece. The inner section likewise has a vertex. In the geometric course, the outer contour approaches in each case said vertex. The approach takes place continuously. The vertex therefore represents that point of the outer region or the inner region which has the respective maximum distance of the respective region in relation to the middle region. In addition it is to be mentioned that the respective "vertex" of the longitudinal section can represent a circumferential line on the actual filter in the case of a circumferential filter interconnecting piece.

As a result, a reduction up to a prevention of turbulent flows can advantageously likewise be achieved. Vibrations are likewise reduced. As a result, the fracture risk is also reduced and fatigue failures are avoided.

In one alternative development, the fluid filter is distinguished by the fact that the outer section and/or the inner section of the filter interconnecting piece have/has a shape with a low coefficient of flow resistance, in particular are/is configured in a hemispherical shell-like or droplet-shaped or parabolic or catenary curve-shaped manner.

This is understood to mean that the outer section is configured in a body shape which has a low cw value. The inner section is likewise configured in a body shape which has a low cw value. This advantageously results in a lower flow resistance. The pressure loss is likewise lower. A lower flow breakaway is also achieved. As a consequence, the turbulences are minimized.

In one advantageous refinement, the fluid filter is distinguished by the fact that the outer section and the inner section of the filter interconnecting piece have a different shape.

This is understood to mean that the outer section and the inner section can have different geometries and functions. The geometry can be designed, for example, with regard to the function as a front piece or an end piece in relation to the main flow direction of the fluid. In the case of the respective design, for example, the fluid flowing velocities in the respective flowing direction and the respective incident flow and outflow angles can also be taken into consideration.

As a result, an optimization to the present fluid flow can advantageously be performed. Here, a consideration of and adaptation to a main flow direction can take place, including a consideration and an optimization of a reverse overflow.

In one possible embodiment, the fluid filter is distinguished by the fact that the inner section has a higher gradient than the outer section for the same radial height.

This is to be understood in such a way that the absolute gradient or inclination is taken into consideration, that is to say the magnitude of the gradient value. The gradient is understood to mean the angle which results in the geometric cross section of the filter interconnecting piece between the center axis of the filter interconnecting piece and the tangent on the outer contour at the respective point. This characteristic can apply for all radial heights, except for the vertex as a radial height of zero. This results in a different geometric shape between the inner section and the outer section. A more "acute" end results on the outer section and a more "bulbous" end results on the inner section. In the case of a flow direction from the outside to the inside, the more acute end is configured on the front piece (outer section) and the more bulbous end is configured on the end piece (inner section). A refinement of this type is opposed to the design of classic streamlined bodies which, in particular, have a bulbous end on the front piece and a more acute end on the end piece.

The described refinement advantageously makes an optimized overall shape for the filter possible, however. Here, a reverse overflow which is favorable in flow terms is also made possible. Therefore, an optimum adaptation to all flow situations, such as forward overflowing and reverse overflowing, takes place.

In one preferred development, the fluid filter is distinguished by the fact that a vertex of the inner section is at a smaller spacing from the middle section than a vertex of the outer section, and/or a greater curvature radius is configured at the vertex of the inner section than at the vertex of the outer section.

This characteristic likewise results in a specific geometric shape. The filter interconnecting piece can once again have a more "acute" end on the outer section and a more "bulbous" end on the inner section. The flow guidance in the outer section is longer, furthermore. This advantageously in turn results in optimized flow guidance. For example, reverse overflowing can also be aided.

In one alternative embodiment, the fluid filter is distinguished by the fact that the geometry of the filter interconnecting piece, in particular the geometry of the outer section and/or the inner section, is designed for fluids with high flow velocities; and/or is configured in such a way that turbulences in the fluid are reduced.

This is understood to mean that the shapes of the outwardly pointing projection and the inwardly pointing projection have a specifically defined form, in order to reduce and to avoid turbulent flows. Here, in particular, multi-dimensional forms and profile designs are possible. Here, plus/minus changes in the case of gradients of the outer contours are also conceivable. Surface structures can likewise be advantageous. A design of this type can advantageously take place with consideration of the present conditions and objectives aiming at the respective application. This advantageously results in a reduction of flow breakaways and a reduction of vibrations, and a reduction of fracture formation.

In one possible embodiment, the fluid filter is distinguished by the fact that the flow-optimized geometry of the filter interconnecting piece, in particular the geometry of the outer section and/or the inner section, is determined by means of simulation.

Furthermore, according to the disclosure, a solenoid valve is provided having a fluid filter for a fluid apparatus having a pump element and/or a solenoid valve in a motor vehicle, in particular for an ESP system, the fluid filter being produced by direct injection molding, the fluid filter having at least one filter interconnecting piece, distinguished by the fact that the filter interconnecting piece comprises an outer section, a middle section and an inner section, the outer section being configured as a projection which is directed outward with regard to the fluid filter, and the inner section being configured as a projection which is directed inward with regard to the fluid filter.

Furthermore, a solenoid valve having a fluid filter in accordance with one of the embodiments of the above description is advantageously provided.

Furthermore, according to the disclosure, a pump element is provided having a fluid filter for a fluid apparatus having a pump element and/or a solenoid valve in a motor vehicle, in particular for an ESP system, the fluid filter being produced by direct injection molding, the fluid filter having at least one filter interconnecting piece, distinguished by the fact that the filter interconnecting piece comprises an outer section, a middle section and an inner section, the outer section being configured as a projection which is directed outward with regard to the fluid filter, and the inner section being configured as a projection which is directed inward with regard to the fluid filter.

Furthermore, a pump element having a fluid filter in accordance with one of the embodiments of the above description is advantageously provided.

BRIEF DESCRIPTION OF THE DRAWINGS

It is to be noted that the features which are presented individually in the description can be combined with one another in any desired, technically appropriate way, and indicate further refinements of the disclosure. Further features and expediencies of the disclosure result from the description of exemplary embodiments using the appended figures, in which.

DETAILED DESCRIPTION

Figure 1A:
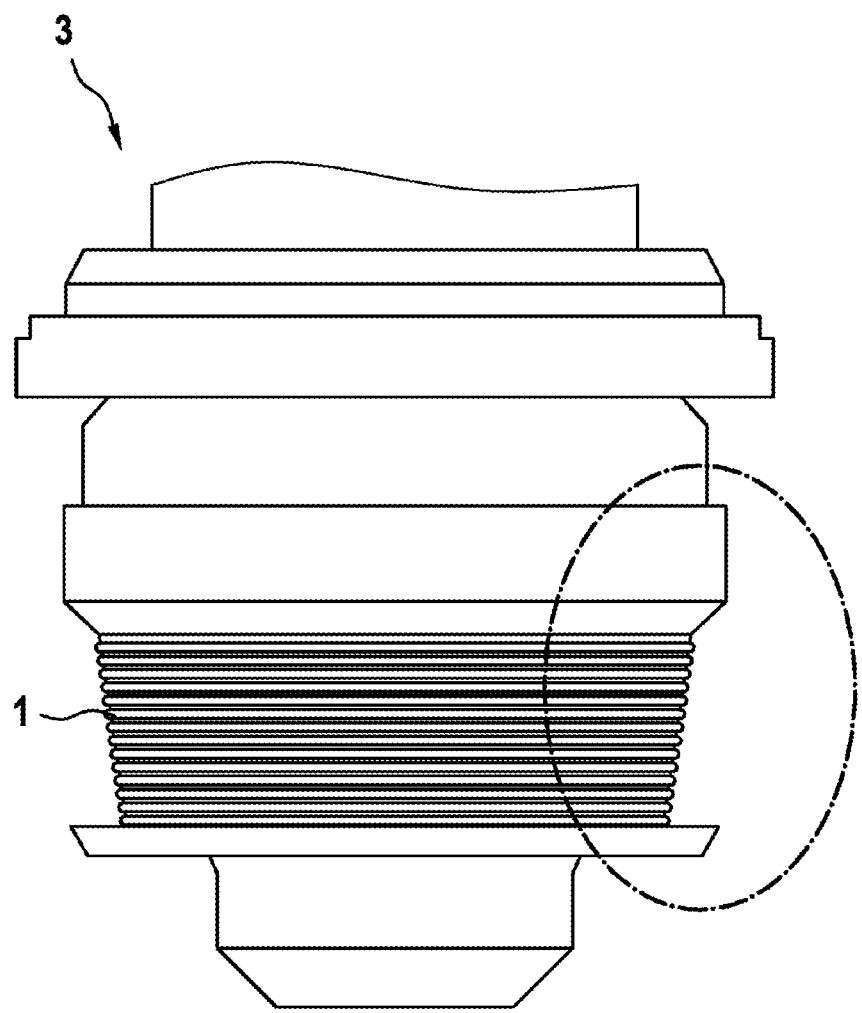
FIG. 1a shows a partial view of a solenoid valve having a fluid filter in accordance with the prior art.
Figure 1B:
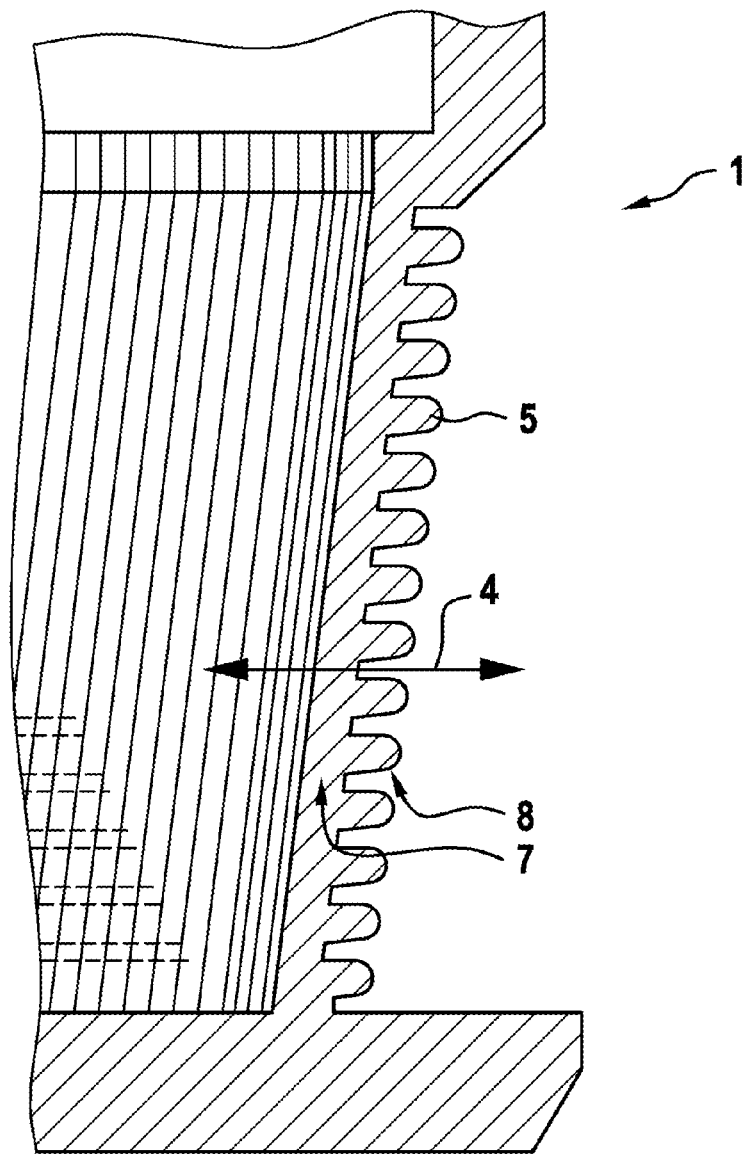
FIG. 1b shows a detailed view of a part of the fluid filter for a solenoid valve in accordance with the prior art.

FIG. 1a shows a partial view of a solenoid valve (3) having a fluid filter (1) in accordance with the prior art. The solenoid valve (3) is shown in an incomplete state. The position of the fluid filter (1) can be gathered from the illustration. The position from which the following detailed view is taken is marked, furthermore. FIG. 1b shows a detailed view of a part of the fluid filter (1) for a solenoid valve (3) in accordance with the prior art. Here, a partial detail of a fluid filter (1) is shown in longitudinal section. Filter interconnecting pieces (5) are shown here. They have a middle section (7) and an outer section (8).

Furthermore, the flowing direction (4) of the fluid is marked. This is bidirectional. That is to say, an inflow and an outflow take place.

Figure 2A:
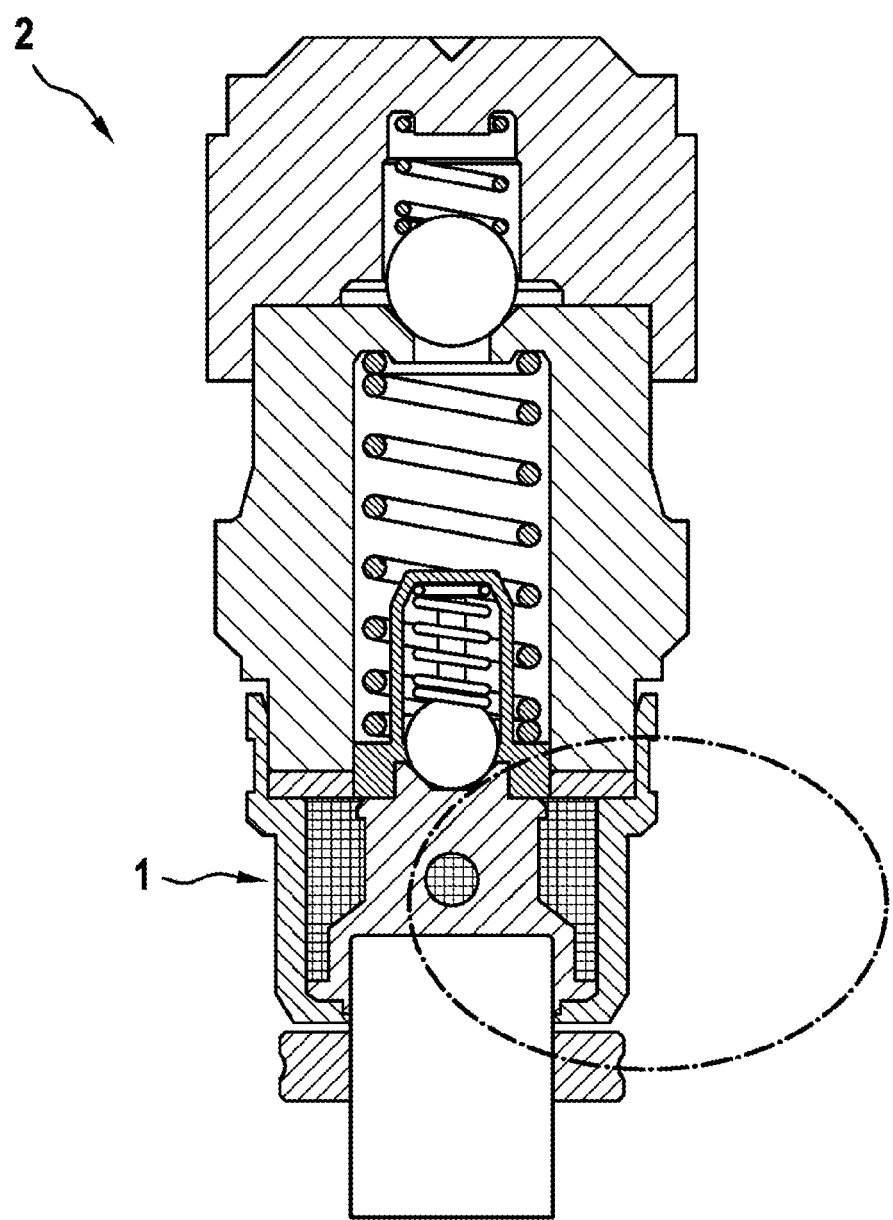
FIG. 2a shows a partial view of a pump element having a fluid filter in accordance with the prior art.
Figure 2B:
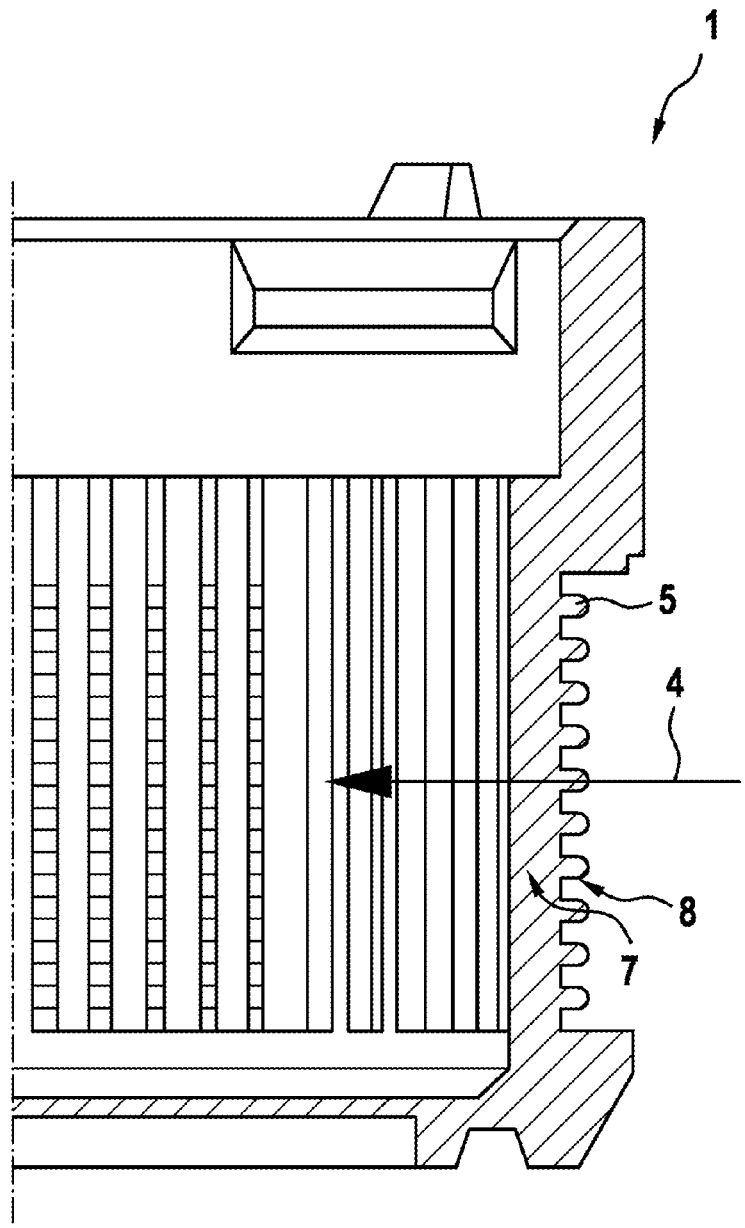
FIG. 2b shows a detailed view of a part of the fluid filter for a pump element in accordance with the prior art.

FIG. 2a shows a partial view of a pump element (2) having a fluid filter (1) in accordance with the prior art. The pump element (2) is shown in an incomplete state. The position of the fluid filter (1) can be gathered from the illustration. The position from which the following detailed view is taken is marked, furthermore. FIG. 2b shows a detailed view of a part of the fluid filter (1) for a pump element (2) in accordance with the prior art. Here, a partial detail of a fluid filter (1) is shown in longitudinal section. Filter interconnecting pieces (5) are shown here. They have a middle section (7) and an outer section (8). Furthermore, the flowing direction (4) of the fluid is marked. This is unidirectional. That is to say, only an inflow takes place.

Figure 3:
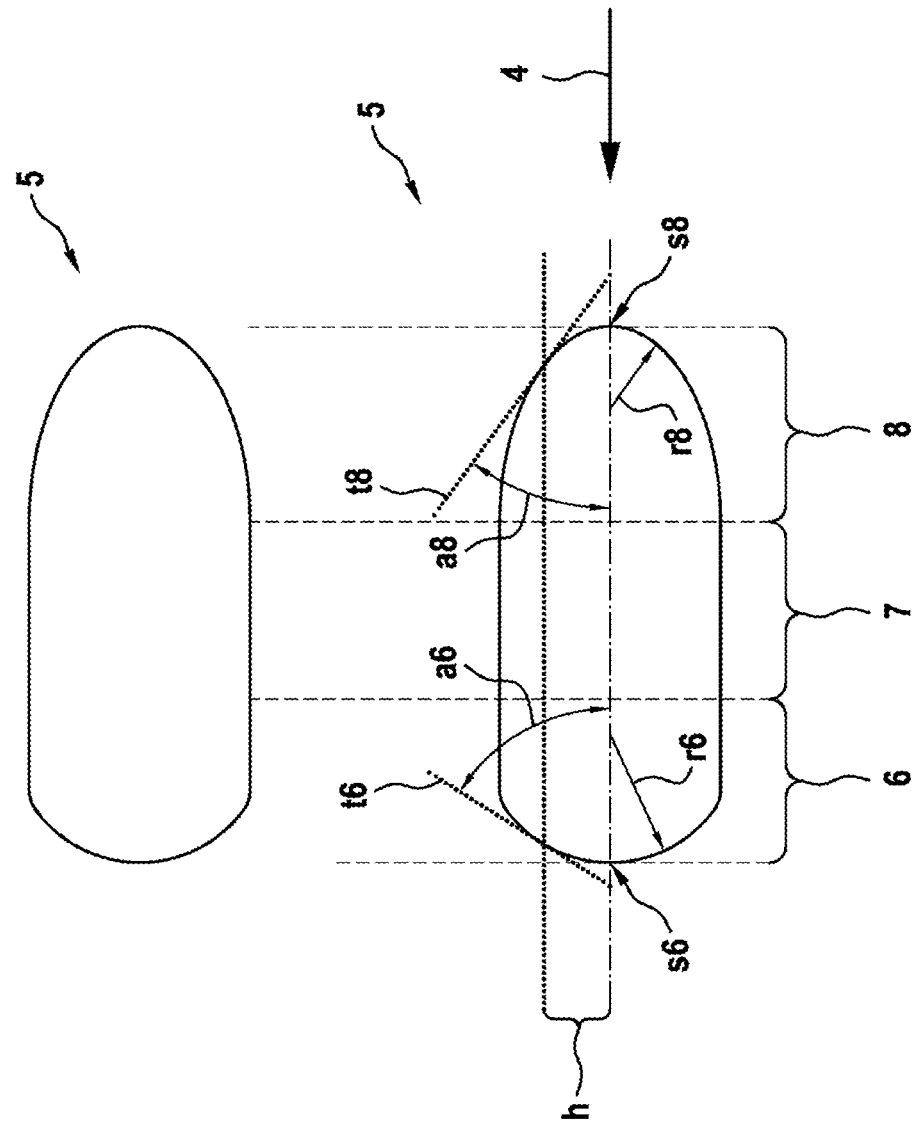
FIG. 3 shows a diagrammatic illustration of two filter interconnecting pieces in accordance with one embodiment according to the disclosure.

FIG. 3 shows a diagrammatic illustration of two filter interconnecting pieces (5) in longitudinal section in accordance with one embodiment according to the disclosure. The filter interconnecting piece (5) likewise comprises a middle section (7). Furthermore, the filter interconnecting piece (5) comprises an outer section (8) and an inner section (6). They are configured as projections. The projections have rounded shapes. Both the outer section (8) and the inner section (6) have a vertex (s6, s8) which defines the respective maximum extent. At the vertex (s8), the outer section (8) has a smaller curvature radius (r8) than the inner section (6) with the curvature radius (r6). Furthermore, two tangents (t6, t8) are shown. The two tangents (t6, t8) bear against the outer side of the filter interconnecting piece (5), at the same radial spacing (h) in relation to the center axis. Here, the tangents (t6, t8) have a gradient (a), the gradient (a6) of the tangent (t6) on the inner section (6) being greater than the gradient (a8) on the outer section (8). Furthermore, the flow direction (4) of the fluid is shown. In said exemplary embodiment, the fluid flows from the outside through the fluid filter (1), said fluid passing first of all the outer section (8), then the middle section (7) and finally the inner section (6) of the filter interconnecting piece (5).

Figure 4A:
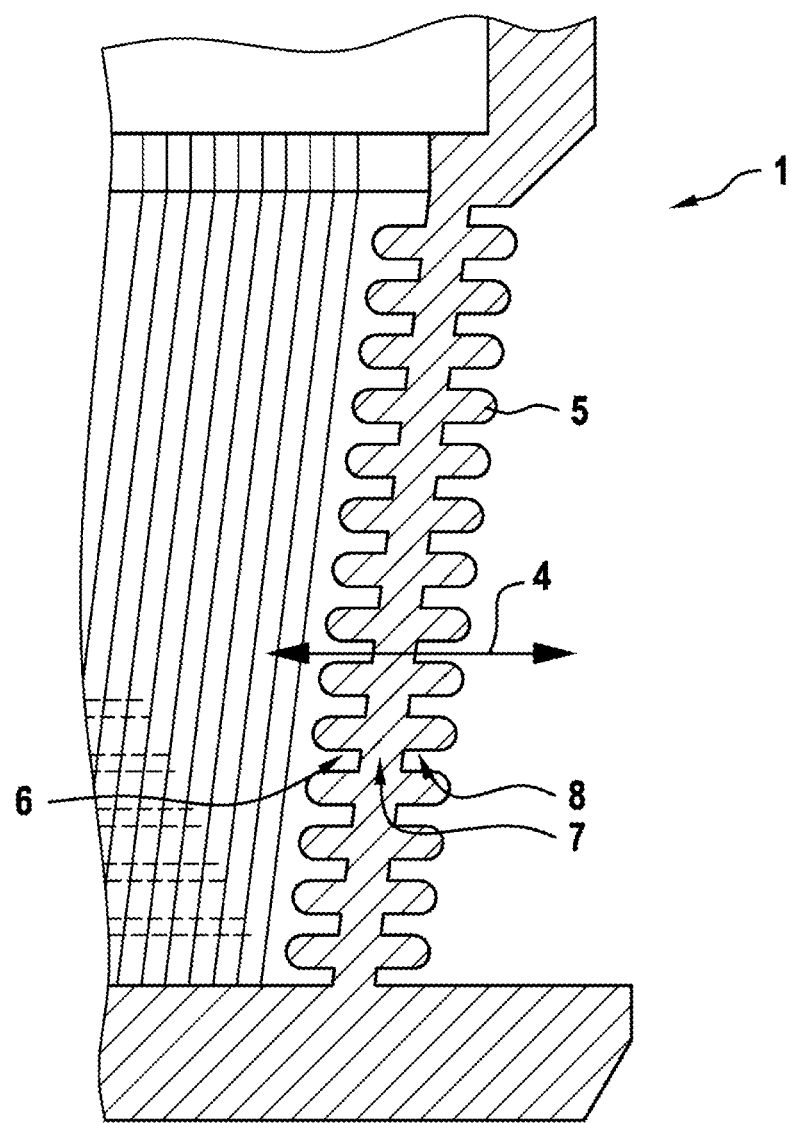
FIG. 4a shows a detailed view of a part of the fluid filter for a solenoid valve in accordance with one embodiment according to the disclosure.

FIG. 4*a* shows a detailed view of a part of the fluid filter (1) for a solenoid valve (3) in accordance with one embodiment according to the disclosure. Filter interconnecting pieces (5) can be seen here. They have an outer section (8), a middle section (7) and an inner section (6). Furthermore, the flow direction (4) of the fluid is illustrated. This is bidirectional in the exemplary embodiment which is shown. That is to say, an inflow and an outflow take place.

Figure 4B:
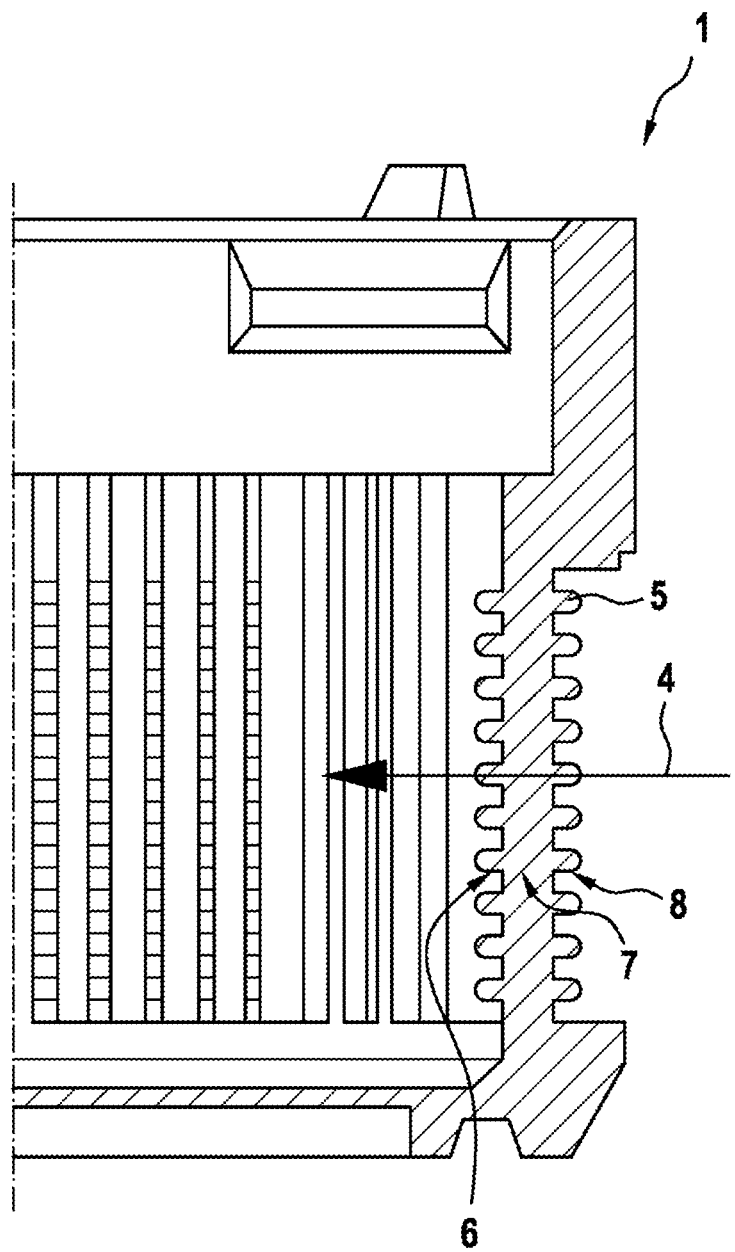
FIG. 4b shows a detailed view of a part of the fluid filter for a pump element in accordance with one embodiment according to the disclosure.

FIG. 4*b* shows a detailed view of a part of the fluid filter (1) for a pump element (2) in accordance with one embodiment according to the disclosure. Filter interconnecting pieces (5) can be seen here. They have an outer section (8), a middle section (7) and an inner section (6). Furthermore, the flow direction (4) of the fluid is illustrated. This is unidirectional in the exemplary embodiment which is shown. That is to say, only an inflow takes place.

The invention claimed is:

1. A fluid apparatus for a motor vehicle, the fluid apparatus comprising:
   a solenoid valve; and
   a fluid filter for the solenoid valve, the fluid filter comprising:
      an upper filter portion;
      an opposite lower filter portion;
      a plurality of filter interconnecting pieces located between the upper filter portion and the lower filter portion and extending around a center axis of the fluid filter, each filter interconnecting piece having:
         an outer section extending away from the center axis and defining a curved outer surface,
         a middle section extending from the outer section toward the center axis, and
         an inner section extending from the middle section toward the center axis and defining a curved inner surface; and
      a plurality of connecting structures, each connecting structure extending directly from a corresponding pair of adjacent middle sections,
   wherein the fluid filter is formed by direct injection molding, such that a continuous section of the fluid filter extends from the upper filter portion to the lower filter portion through the plurality of interconnecting pieces and the plurality of connecting structures.

2. The fluid apparatus as claimed in claim 1, wherein:
   a first curve of the curved outer surface corresponds to a first differentiable function defining the first curve, and
   a second curve of the curved inner surface corresponds to a second differentiable function defining the second curve.

3. The fluid apparatus as claimed in claim 1, wherein one or more of the outer section and the inner section has a flow-optimized shape configured (i) to reduce turbulent flows through the fluid filter, and (ii) to reduce a risk of fracture of the fluid filter.

4. The fluid apparatus as claimed in claim 1, wherein one or more of the outer section and the inner section has a flattening geometry configured (i) to prevent turbulent air flows through the fluid filter, and (ii) to reduce vibrations of the fluid filter.

5. The fluid apparatus as claimed in claim 1, wherein one or more of the curved outer surface and the curved inner surface has a hemispherical shape.

6. The fluid apparatus as claimed in claim 1, wherein the curved outer surface and the curved inner surface have a different shape.

7. The fluid apparatus as claimed in claim 1, wherein the curved inner surface has a higher gradient than the curved outer surface for the same radial height.

8. The fluid apparatus as claimed in claim 1, wherein:
   the middle section defines a middle in a radial direction from the center axis,
   the curved outer surface defines an outer vertex spaced a first distance from the middle of the middle section along the radial direction,
   the curved inner surface defines an inner vertex spaced a second distance from the middle of the middle section along the radial direction, and
   the second distance is less than the first distance.

9. The fluid apparatus as claimed in claim 1, wherein the fluid filter is configured for an ESP system.

10. The fluid apparatus as claimed in claim 1, wherein the curved outer surface and the curved inner surface are droplet-shaped, parabolic shaped, or catenary curve-shaped.

\* \* \* \* \*